United States Patent
Autrata et al.

[11] Patent Number: 5,846,174
[45] Date of Patent: Dec. 8, 1998

[54] ROLL

[75] Inventors: Jochen Autrata, Moers, Germany; Eugen Schnyder, Waltenschwil, Switzerland; Wolf Gunter Stotz, Ravensburg, Germany

[73] Assignee: Voith Sulzer Papiermaschinen GmbH, Heidenheim, Germany

[21] Appl. No.: 921,021

[22] Filed: Aug. 29, 1997

Related U.S. Application Data

[63] Continuation of Ser. No. 562,092, Nov. 22, 1995, abandoned.

[30] Foreign Application Priority Data

Nov. 25, 1994 [DE] Germany .................. 44 42 016.1

[51] Int. Cl.$^6$ .................................................. B23P 15/00
[52] U.S. Cl. ................................ 492/7; 492/16; 492/20
[58] Field of Search ........................... 492/1, 5, 7, 16–20

[56] References Cited

U.S. PATENT DOCUMENTS

| | | |
|---|---|---|
| 4,581,797 | 4/1986 | Lehmann . |
| 4,955,120 | 9/1990 | Brendel et al. .............. 492/7 |
| 5,167,768 | 12/1992 | Cronin et al. . |
| 5,290,223 | 3/1994 | Lehmann ................... 492/7 |

FOREIGN PATENT DOCUMENTS

| | | |
|---|---|---|
| 0345501 | 11/1992 | European Pat. Off. . |
| 4223715 | 1/1994 | Germany . |
| 1492219 | 1/1976 | United Kingdom . |

OTHER PUBLICATIONS

United Kingdom Search Report.
German Office Action, dated Feb. 13, 1995.
Kotitschke, Gerhard, "Neue Generation von Nasspressen für Kraftliner und Testliner," Wochenblatt für Papierfabrikation, 1984, vol. 22, pp. 831–837.

*Primary Examiner*—I. Cuda
*Attorney, Agent, or Firm*—Greenblum & Bernstein, P.L.C.

[57] ABSTRACT

A roll including a flexible roll covering, the roll covering being rotatably arranged about a carrier and journalled on the carrier via a plurality of at least one of hydrodynamically and hydrostatically lubricated support elements, wherein support areas of at least axially adjacent support elements are closely adjacently adjoined and wherein lateral boundaries of the support areas of the axially adjacent support elements overlap with reference to a circumferential direction of the roll, with the support of the roll covering being evened out without resulting in the jamming or canting of the support elements, this being accomplished in that the support areas of the support elements are symmetrically formed transverse or cross-wise relative to the roll axis of the roll.

25 Claims, 2 Drawing Sheets

ROLL

This application is a continuation of application Ser. No. 08/562,092, filed Nov. 22, 1995, now abandon.

CROSS REFERENCE TO RELATED APPLICATIONS

This application claims the priority of German Application No. DE P 44 42 016.1, filed No. 25, 1994, the disclosure of which is incorporated herein by reference in its entirety.

BACKGROUND OF THE INVENTION

1. Field of the Invention

This invention pertains to a roll including a flexible roll covering, the roll covering being rotatably arranged about a carrier and journalled on the carrier via a plurality of at least one of hydrodynamically and hydrostatically lubricated support elements, wherein support areas of at least axially adjacent support elements are closely adjacently adjoined and wherein lateral boundaries of the support areas of the axially adjacent support elements overlap with reference to a circumferential direction of the roll. These types of rolls are utilized particularly during the production or treatment of material webs or bands, such as fiber webs and tissue.

2. Discussion of the Background of the Invention and Material Information

In order herein to equalize the pressure drop, with reference to the contact pressure, upon the inner surface of the roll covering, between the support areas of the support elements, which becomes of increasing importance particularly with the use of flexible roll coverings of a relative small thickness, it is among other things, set forth in German Patent Publication DE-OS 42 23 715, that the support area is of a parallelogram shape wherein two sides extend in the axial direction and the other two sides extend cross-wise in the circumferential direction, that is that they overlap in the circumferential direction.

It has however been determined that these support elements tend to distort around the radial axis of the pressing piston-cylinder-unit and thereby tend to twist or jam together.

It is thus the task or object of this invention to even out or average the support of the roll covering without however causing any twisting, tilting, locking or jamming.

SUMMARY OF THE INVENTION

This task or object is achieved via the devices set forth in the appended claims, wherein a first embodiment of the roll includes a flexible roll covering, the roll covering being rotatably arranged about a carrier and journalled on the carrier via a plurality of at least one of hydrodynamically and hydrostatically lubricated support elements, wherein support areas of at least axially adjacent support elements are closely adjacently adjoined and wherein lateral boundaries of the support areas of the axially adjacent support elements overlap with reference to a circumferential direction of the roll, with the support areas of the support elements having a symmetry line extending transverse to or cross-wise to a roll axis of the roll.

In a further embodiment of the roll of this invention, the support areas of the support elements are symmetrically formed with reference to the roll axis of the roll.

In another embodiment of the roll of this invention, the support elements include hydrostatic pockets having peripheral webs, with the webs, at least in a transition region with an axially adjacent support element, being as small as possible in width, with this width preferably being in the range of 0.1 to 3 mm.

In a differing embodiment of the roll of this invention, support elements of differing axial extents are combined in a single roll.

In yet a further embodiment of the roll of this invention, support elements of at least one of differing support area shapes and support area sizes produce, with the same contact pressure, the same line pressure in a press gap formed by a combination of the roll with a mating roll.

In yet another embodiment of the roll of this invention, the support area of always one of axially adjacent support elements is formed of an approximate circular or elliptical shape and the support area of always another of axially adjacent support elements, is of a corresponding concave shape.

In yet a differing embodiment of the roll of this invention, the roll includes multiple support elements, with the multiple support elements being laterally arranged in the circumferential direction of the roll.

Since the hydrodynamically and/or hydrostatically lubricated support areas of the support elements have a symmetry line extending obliquely to the roll axis, this improves the alignment of the support elements with reference to the inlet and outlet of the lubricating gap between the respective support element and the roll covering. This evens out the lubricating gap and acts against tilting or jamming of the support elements, particularly even then when the support elements are provided with hydrostatic pockets that are symmetrically arranged, wherein the line of symmetry extends perpendicularly or vertically to the carrier through the center of the support element.

This positive effect can be explained particularly that the lubricating fluid at its entrance into the hydrodynamic lubricating gap between a support element and the roll covering is cooler and thus tougher or more viscous than during its exit therefrom. The higher friction at the entrance or inlet leads to the formation of a moment of rotation at the support element in so far it has no line of symmetry cross-wise to the roll axis, thus leading to the described results. The same holds true for the lubricating fluid that adheres to the inner surface of the roll covering and the lubricant accumulating on a support element. In case the support element does not have a symmetry line that extends cross-wise to the roll axis, this leads to the formation of a moment of rotation. The symmetry requirement must also be considered in the arrangement of the hydrostatic pockets.

The twisting, tilting, locking or jamming, at the support elements, can, in addition to the already noted measures, be further effectively prevented in that the support areas of the support elements are also additionally symmetrically formed with respect to the roll axis.

The peripheral webs therein, at least in the transition region of the respective axially adjacent support element, should be very narrow, preferably having a width in the range of 0.1 to 3 mm, so that the pressure drop or decrease via pressure degradation over the width of the peripheral webs, in the axial direction between the support elements, with reference to their expansion, is minimized, and therewith evens out the stiffness, even though small, of the roll covering.

The transition line between the support areas of axially adjacent support elements is preferably arc-shaped which also positively effects the production costs, for example, the casting of the support elements.

It can also be advantageous that it is possible to combine support elements of differing axial extents in a single roll. This provides the advantage that, for example, very small support elements are used only at the edges of the roll, since such usage over the entire roll would be too expensive, and small support rolls can, depending on need, for example with narrow material webs, be shut off and thereby save energy. In order to keep the expense for the control of the contact pressure modest, the support elements, including their contact pressure system, should be so constructed that even support elements of differing support area form and/or sizes will produce, in conjunction with a mating roll, at the same hydraulic contact pressure, the same line pressure in the press gap.

A circle or an ellipse is an advantageous form of configurations for the support area of a respective one of the axially adjacent support elements, which of course does not exclude other forms. The respective adjacent support element associated therewith should, in the region of the transition line between the two adjacent support elements, have a corresponding concave shaped support area.

In addition thereto, it is feasible that several support elements, in the circumferential direction, can also be arranged laterally or side-by-side. This is of importance particularly in the formation of long press gaps, which, for example, are utilized for the dehydration and smoothing of fiber webs. It is also possible to influence the pressure gradient in the circumferential direction. The transition lines between the support areas of the axially arranged support elements should be offset relative to axially adjacent rows in order to avoid the transition lines continuously extending in the circumferential direction between the axially extending rows of support elements and therewith for also averaging of the pressure gradient. Principally, in this connection, it is of course also possible that the circumferentially adjacent support elements, with reference to the circumferential direction, overlap and are of corresponding shape.

BRIEF DESCRIPTION OF THE DRAWINGS

The invention which will be described with reference to five main embodiments thereof will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS AND BEST MODE

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
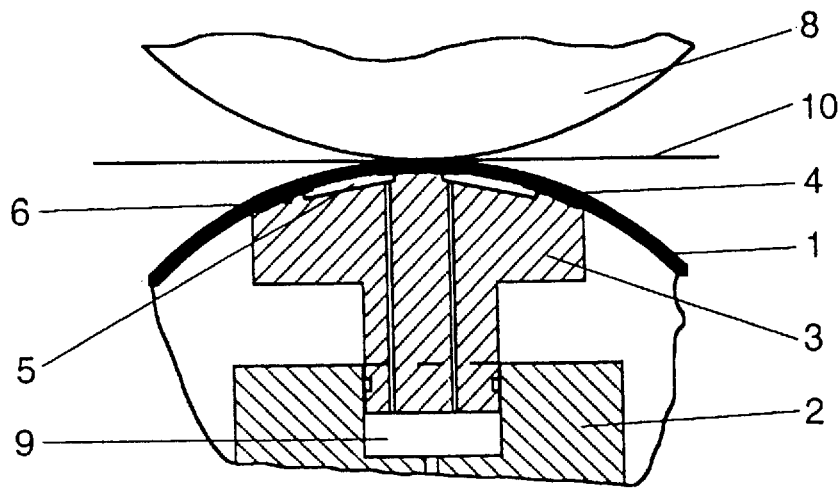
FIGS. 1 and 5 are cross sectional views of two respective versions of support elements of this invention.

As per FIG. 1, the roll, roller or cylinder of this invention, is preferably comprised of a flexible roll jacket or covering 1, that is rotatable about a carrier 2, and is journalled thereupon via a plurality of hydrostatically lubricated support elements 3. The contact pressing of support elements 3 is accomplished, in each case, via a hydraulic chamber 9 of carrier 2. Other types of contact pressure systems can also be utilized.

The roll, in combination with a mating or opposing roll 8, forms a press gap or nip for treating a material web or band 10. In order to form the press direction, in the press gap, as uniform as possible, particularly with flexible roll coverings 1, the support areas 4 of adjacent support elements 3, are adjoined as closely as possible and the lateral boundaries of support areas 4, of axially adjacent support elements 3, overlap each other with reference to the circumferential direction of the roll, as can readily be recognized in the embodiments of FIGS. 2 to 4.

In order that support elements 3 do not cant or jam, support areas 4 thereof are symmetrically formed cross-wise to the roll axis (WA) so that differing temperatures of the lubricating fluid cannot, with reference to the inlet and outlet thereof, effect a turning moment relative to support element 3. Thus, a line of symmetry for support area 4 may be positioned, e.g., substantially perpendicular to roll axis WA. In addition, a transition line 7, between support areas 4 of axially adjacent support elements 3, is arc-shaped.

Figure 2:
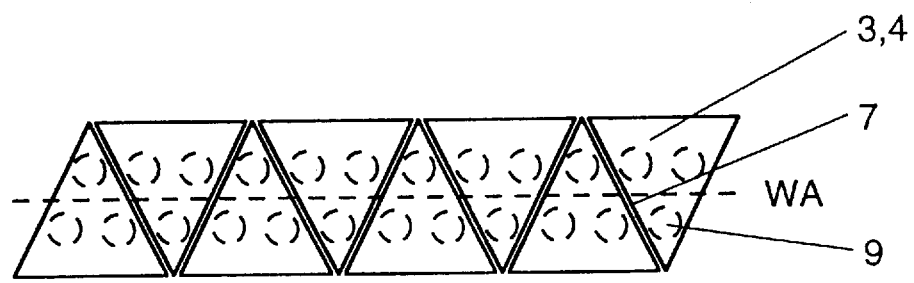
FIGS. 2 to 4, as well as 6 and 7, are top plan views of respectively differing embodiments of forms of the support elements of this invention.

FIG. 2 shows a schematically illustrated portion of a top plan view of approximately triangular laterally arranged or side-by-side, hydrodynamically lubricated support elements 3, each of which is provided with three cylinder-piston-units having a hydraulic pressure chamber 9 each, for effecting the contact pressure. This makes it possible to produce a wide press gap or nip and to influence the contact pressure in the circumferential direction.

Figure 3:
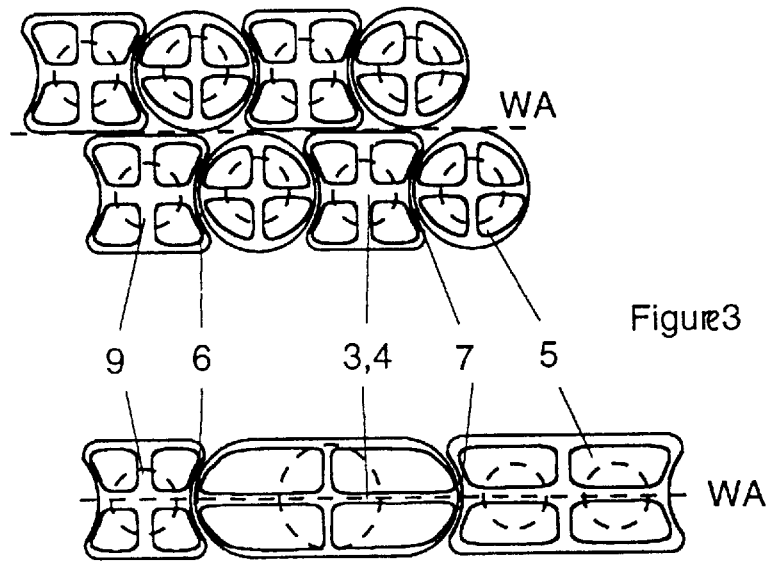
Figure 4:
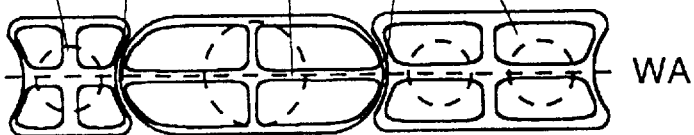

Deviating therefrom, support elements 3 in FIGS. 3 and 4 have hydrostatic pockets 5 for lubricating the gap or nip between support element 3 and roll covering 1. The peripheral webs or rim land areas 6 of pockets 5, particularly in the transition region between axially adjacent support elements 3, are very small or thin, which effectively limits the expansion of the pressure drop between support elements 3.

In order to even more effectively prohibit the twisting and jamming of support elements 3, support areas 4 thereof, in FIGS. 3 and 4, also have a line of symmetry extending parallel to the roll axis (WA).

Furthermore, FIG. 3 shows two rows of axially laterally arranged support elements 3 that are adjacently arranged in the circumferential direction. These rows, with reference to transition line 7 of support elements 3, are arranged offset relative to each other.

Of the many constructional possibilities, with reference to support areas 4, FIGS. 2 to 4 show relatively simple and practical examples thereof.

Figure 5:
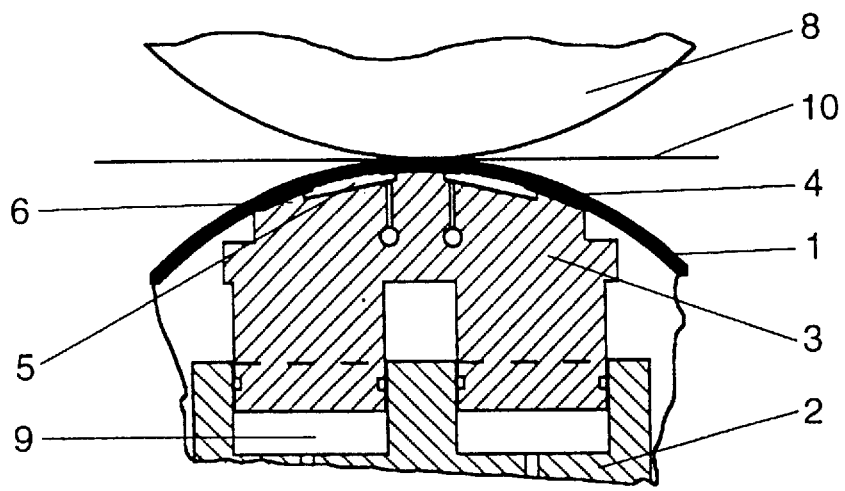

FIG. 5 shows, as distinct from FIG. 1, a support element 3 that is pressed via two adjacently arranged, in the circumferential direction, hydraulic pressure chambers 9 in carrier 1. These chambers can be controlled independently of each other, so that this also enables an influencing of the contact pressure in the circumferential direction. In addition, this offers, particularly with small support elements 3, having a concave transition line 7, the possibility of increasing the pressure area emanating from pressure chambers 9.

Figure 6:
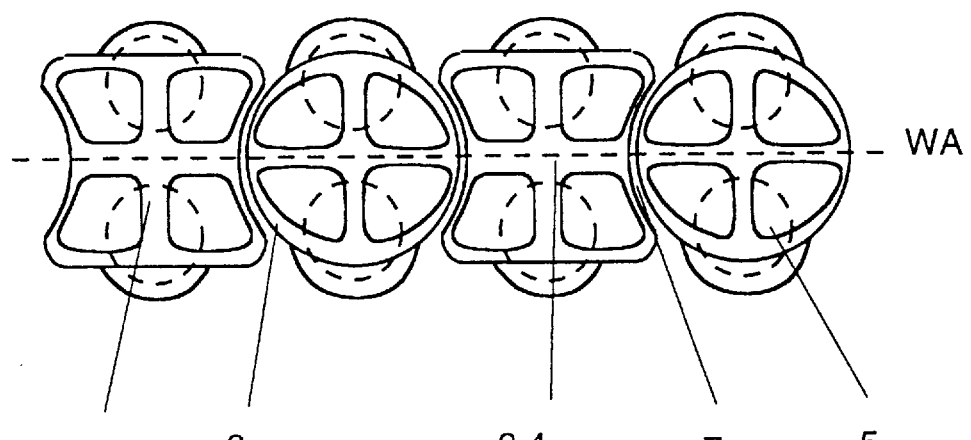
Figure 7:
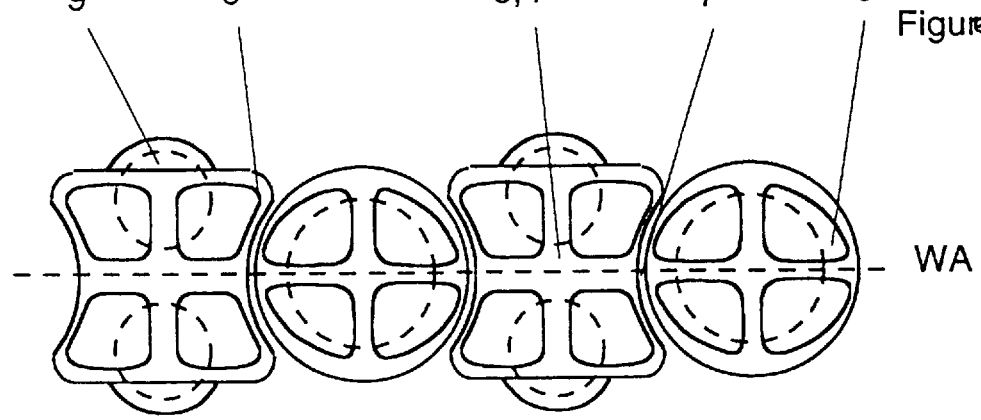

FIGS. 6 and 7 show an axial row of support elements 3, similar to those illustrated in FIGS. 3 and 4, wherein in FIG. 6 all support elements 3 have two pressure chambers 9 in the circumferential direction, while in FIG. 7 this is restricted to only those support elements having concave axial lateral boundaries. Therefore, in the latter instance, pressure chamber 9 of support elements 3 with convex axial lateral boundaries, have an active pressure area that is twice as large as the single pressure chambers of concave support elements 3.

In order to be able to combine axially laterally adjacent support elements 3 of differing axial extents in one roll, transition line 7, between support areas 4 of axially adjacent support elements 3, is formed the same, as is particularly well illustrated in FIG. 4. Attention must also be given to the fact that even support elements 3 of a differing support area shape and/or support area size, with the same contact pressure in pressure chamber 9, also have to produce the same line pressure in the press gap with a mating or opposing roll 8. This can be accomplished via a variation in the number of pressure chambers 9, per support element 3, or via a variation of the active pressure area or surface of pressure chambers 9.

The position of the center of gravity of the area or surface and the center of gravity of the force must also be considered since a deviation of same from each other results in an inclination of the support element, which at least in a small measure, under certain circumstances, may even be desirable.

In order that there is no resulting uneven thermal stress or loading of support elements 3, in the region of their support areas 4, and thereby does not result in an uneven thermal loading of roll covering 1, attention must be paid, at hydrostatic support elements 3, that the fluid delivery above the lubricating gap between support area 4 and roll covering 1 of individual hydrostatic pockets 5 is not overly limited in favor of other such pockets. This means that all pockets 5, in the circumferential direction, must be provided with a sufficiently long peripheral web 6 to the interior of roll covering 1, which is most easily accomplished via the arrangement of the boundary webs between the hydrostatic pockets of support areas 4 in and perpendicular to the direction of roll axis WA.

The directional notations, axial and radial, in this description, are always deemed to be with reference to the roll.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A roll including a flexible roll covering, the roll covering being rotatably arranged about a carrier and journalled on the carrier via a plurality of at least one of hydrodynamically and hydrostatically lubricated support elements, wherein support areas of at least axially adjacent support elements are closely adjacently adjoined and wherein lateral boundaries of the support areas of the axially adjacent support elements overlap with reference to a circumferential direction of the roll, with the support areas of the support elements having a symmetry line extending cross-wise to a roll axis of the roll.

2. The roll of claim 1, wherein the support areas of the support elements are symmetrically formed with reference to the roll axis of the roll.

3. The roll of claim 1, wherein the support elements include hydrostatic pockets having peripheral webs, with the webs, at least in a transition region with an axially adjacent support element, being as small as possible in width.

4. The roll of claim 3, wherein the width is in the range of 0.1 to 3 mm.

5. The roll of claim 2, wherein the support elements include hydrostatic pockets having peripheral webs, with the webs, at least in a transition region with an axially adjacent support element, being as small as possible in width.

6. The roll of claim 5, wherein the width is in the range of 0.1 to 3 mm.

7. The roll of claim 1, wherein support elements of differing axial extents are combined in a single roll.

8. The roll of claim 2, wherein support elements of differing axial extents are combined in a single roll.

9. The roll of claim 3, wherein support elements of differing axial extents are combined in a single roll.

10. The roll of claim 1, wherein support elements of at least one of differing support area shapes and support area sizes produce, with the same contact pressure, the same line pressure in a press gap formed by a combination of the roll with a mating roll.

11. The roll of claim 2, wherein support elements of at least one of differing support area shapes and support area sizes produce, with the same contact pressure, the same line pressure in a press gap formed by a combination of the roll with a mating roll.

12. The roll of claim 3, wherein support elements of at least one of differing support area shapes and support area sizes produce, with the same contact pressure, the same line pressure in a press gap formed by a combination of the roll with a mating roll.

13. The roll of claim 7, wherein support elements of at least one of differing support area shapes and support area sizes produce, with the same contact pressure, the same line pressure in a press gap formed by a combination of the roll with a mating roll.

14. The roll of claim 1, wherein the support area of always one of axially adjacent support elements is formed of an approximate circular or elliptical shape and wherein the support area of always another of axially adjacent support elements, is of a corresponding concave shape.

15. The roll of claim 2, wherein the support area of always one of axially adjacent support elements is formed of an approximate circular or elliptical shape and wherein the support area of always another of axially adjacent support elements, is of a corresponding concave shape.

16. The roll of claim 3, wherein the support area of always one of axially adjacent support elements is formed of an approximate circular or elliptical shape and wherein the support area of always another of axially adjacent support elements, is of a corresponding concave shape.

17. The roll of claim 7, wherein the support area of always one of axially adjacent support elements is formed of an approximate circular or elliptical shape and wherein the support area of always another of axially adjacent support elements, is of a corresponding concave shape.

18. The roll of claim 10, wherein the support area of always one of axially adjacent support elements is formed of an approximate circular or elliptical shape and wherein the support area of always another of axially adjacent support elements, is of a corresponding concave shape.

19. The roll of claim 1, wherein the roll includes multiple support elements, with the multiple support elements being laterally arranged in the circumferential direction of the roll.

20. The roll of claim 2, wherein the roll includes multiple support elements, with the multiple support elements being laterally arranged in the circumferential direction of the roll.

21. The roll of claim 3, wherein the roll includes multiple support elements, with the multiple support elements being laterally arranged in the circumferential direction of the roll.

22. The roll of claim 7, wherein the roll includes multiple support elements, with the multiple support elements being laterally arranged in the circumferential direction of the roll.

23. The roll of claim 10, wherein the roll includes multiple support elements, with the multiple support elements being laterally arranged in the circumferential direction of the roll.

24. The roll of claim 14, wherein the roll includes multiple support elements, with the multiple support elements being laterally arranged in the circumferential direction of the roll.

25. The roll of claim 1, the symmetry line of the support areas extending substantially perpendicular to the roll axis.

\* \* \* \* \*